W. H. Allen,
Elevator,
№ 29,751.  Patented Aug. 28, 1860.
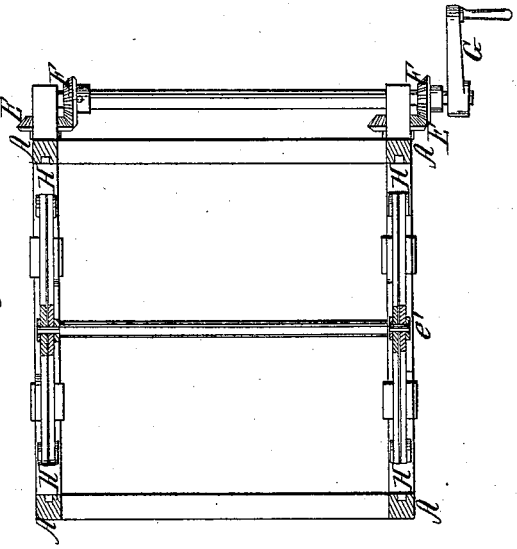
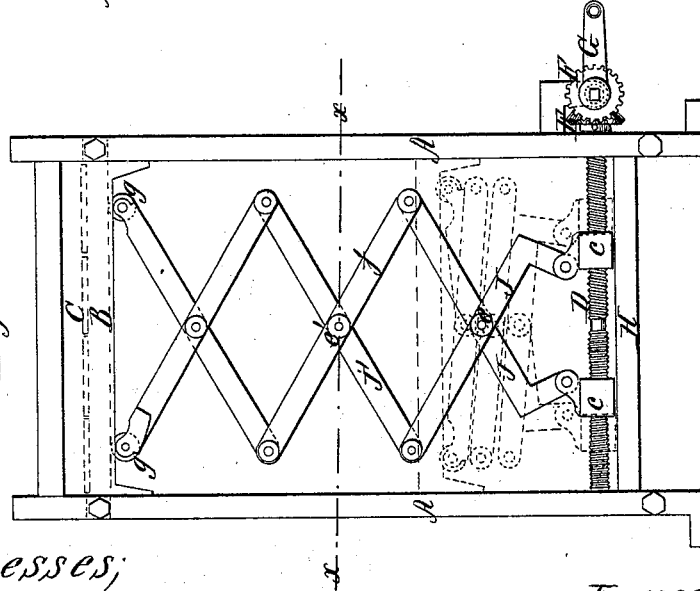
Witnesses;
Wm Thompson
Chas Hughes
Inventor;
W. H. Allen

UNITED STATES PATENT OFFICE.

W. H. ALLEN, OF BROOKLYN, NEW YORK.

ELEVATOR FOR STOREHOUSES.

Specification of Letters Patent No. 29,751, dated August 28, 1860.

*To all whom it may concern:*

Be it known that I, W. H. ALLEN, of Brooklyn, in the county of Kings and State of New York, have invented a new and useful Elevator for Storehouses, &c.; and I do hereby declare that the following is a full, clear, and exact description thereof, reference being had to the accompanying drawings, forming a part of this specification, in which—

Figure 1 represents a side elevation of the elevator, showing the parts that operate the platform, and the platform, in two positions. Fig. 2, is a horizontal sectional view of Fig. 1, taken through the red line $x, x,$ indicated thereon.

Similar letters of reference indicate corresponding parts in both figures.

To enable those skilled in the art to fully understand my invention, I will proceed to describe its construction and operation.

In the drawings, A, A, A, A, represent four uprights that pass up through the floors or hatchway of a building, and securely stayed and braced to prevent their casual displacement, and to make them, if desirable, serve as supporters for the floors, up through which they pass. These uprights may be made of metal or wood, and they should be placed at equal distances apart and kept in a parallel line with each other. Between each pair of the upright pieces A, is placed a bar B, with toe pieces on its ends. These bars are tennoned into the grooves in the uprights, and upon them is placed the platform C, which should be capable of moving the entire length of the upright shafts. Down near the base of this frame-work are placed two screw shafts D, which have their bearings in the frame, and are operated by bevel gears E, F, and crank G, or by any other suitable mechanical movement. There are two screw shafts D, and these are placed in a horizontal position, and directly opposite the other in the lower part of frame A; and immediately under these shafts are transverse stay timbers H. The shafts D are right and left screw shafts respectively, and each carries two sliding blocks or nuts $c, c,$ which are so placed on the shafts that they preserve a uniform distance from the middle of the shafts during their movement, which is in a direction with the length of their shafts.

To the upper surfaces of the blocks $c, c,$ are jointed right angular levers J, J, which are crossed and jointed together at $e,$ the ends of these levers J, J, are jointed to two others J', J', that are jointed at $e',$ and these levers are in their turn jointed to others of a similar length, and so on, the system of levers may be continued indefinitely. These levers it will be seen are what are termed extension jointed levers, as each pair is acted upon by each opposite pair, and they have no established point; they are thus admirably adapted to the purposes for which they are now used. The extreme upper levers, have on their upper ends, friction rollers $g, g,$ which act against the bottom of the platform bars B, upon which the platform rests. There are two columns of these extension levers, each of which should be operated so that they will rise and fall simultaneously, and thus keep the platform horizontal in its movements.

The screw threads on each shaft D, may be made very fine, so as to obtain great power where the elevator is to be used for large and heavy work, but for all ordinary purposes, quite a coarse thread will serve, then with suitable gearing for operating these screw shafts, the power, either manual or mechanical, may be applied to the extension joints to a very great advantage.

It is proposed to place the elevating machinery down in the basement or sub-basement of the house, so that when the jointed levers are in a closed state, the platform will be level with the first floor, and thus everything may be closed up out of sight and out of the way. The power to operate the screw may be applied from any convenient point by carrying up a leader shaft from the lower gearing.

The extension levers should be braced against a lateral thrust by rods placed at the joints at intermediate points between the platform and screw shafts.

Having thus described the general features of my invention what I claim as new, and desire to secure by Letters Patent, is—

The arrangement and combination of the two double threaded screw shafts D, D, sliding blocks $c, c,$ bars B, platform C, and guide frame A, with the jointed levers J, J', as and for the purposes herein set forth and described.

W. H. ALLEN.

Witnesses:
CHAS. HUGHES,
M. M. LIVINGSTON.